Sept. 11, 1928.
S. P. NIXDORFF
1,684,138
MEANS FOR REPRODUCING POSITION
Original Filed Sept. 29, 1925
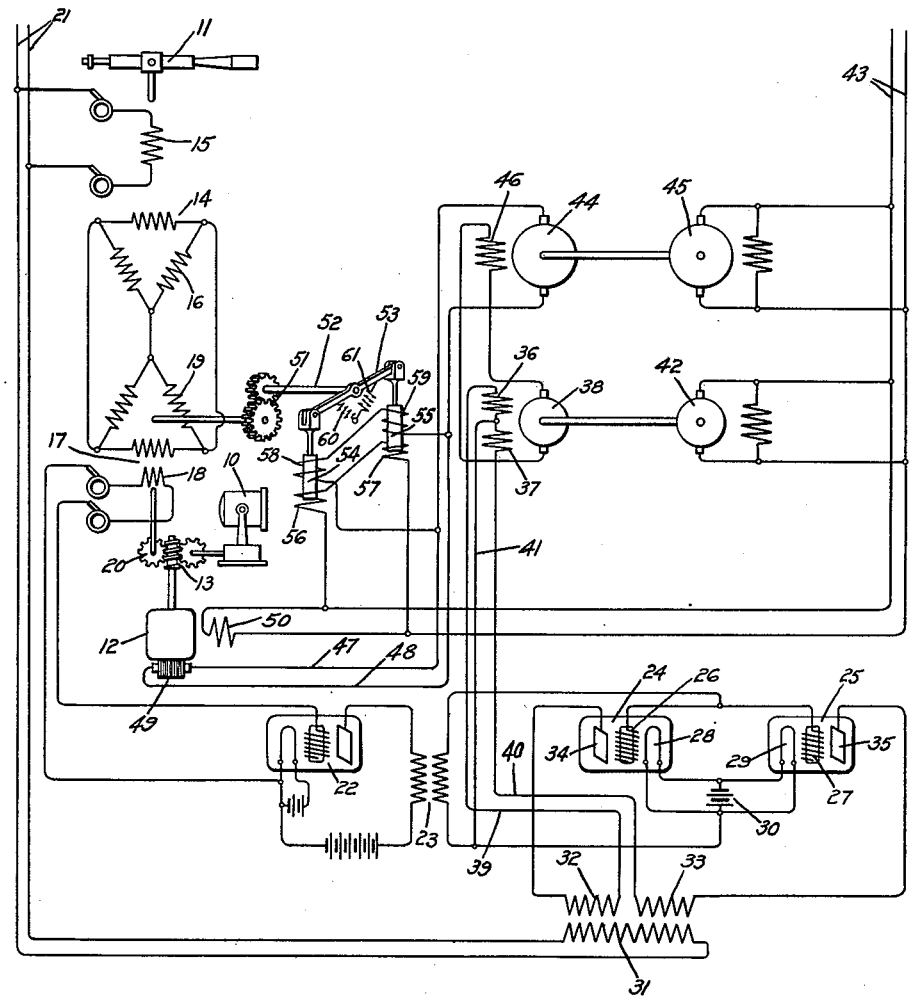
Inventor:
Samuel P. Nixdorff.
by *Alexander T. Lunt*
His Attorney.

Patented Sept. 11, 1928.

1,684,138

UNITED STATES PATENT OFFICE.

SAMUEL P. NIXDORFF, OF SCHENECTADY, NEW YORK, ASSIGNOR TO GENERAL ELECTRIC COMPANY, A CORPORATION OF NEW YORK.

MEANS FOR REPRODUCING POSITION.

Application filed September 29, 1925, Serial No. 59,409. Renewed January 26, 1928.

My invention relates to means for reproducing position and has for its object the provision of means for controlling a remote driving motor.

More specifically my invention relates to systems for reproducing position in which the motion of a controlling object is utilized through suitable mechanism to control a motor so as to cause the motor to drive a second or controlled object into positional agreement with the first. Such a system is described and claimed, for example, in Patent No. 1,547,392 to Hewlett and Willard, dated July 28, 1925. There is a tendency in these systems for the driving motor to overrun after its circuit has been broken by reason of its own inertia and the inertia of the other moving parts associated with it and thereby move the controlled object too far. In one of its aspects my invention relates to means whereby the final position of the controlled object is anticipated by the control mechanism in such manner that the driving motor is brought to rest with great precision at the instant that the controlled object moves into positional agreement with the controlling object, such as described and claimed in a copending application of Edward M. Hewlett and Waldo W. Willard, Serial No. 72,201, filed November 30, 1925, assigned to the same assignee as this invention, of which this invention is an improvement.

In carrying out my invention I provide means responsive to the energization of the driving motor for affecting the motor control mechanism so as to anticipate the final position of the controlled object.

For a more complete understanding of my invention reference should be had to the accompanying drawing, the single figure of which shows in diagrammatic form a system for reproducing position embodying my invention.

Referring to the drawing, I have shown my invention in one form as applied to the control of a searchlight 10 in accordance with the movements of a remotely located telescope 11, the searchlight being controlled in such manner that it is caused to follow the movements of the telescope and thereby be directed on the same object as the telescope. As shown the searchlight is driven in train, i. e. in a plane which is normally horizontal, so as to follow the train of movements of the telescope in a plane which is the same or parallel to the train plane of the searchlight. The searchlight is operated by suitable driving means, such as a direct current electric motor 12, which is connected through gearing 13 to drive the searchlight in train. The circuit of the electric motor 12 is controlled in accordance with the movements of the telescope 11 so as to cause the motor to drive the searchlight.

Operatively connected to the searchlight 10 is an inductive device 14 comprising in the form shown a field winding 15 which is rotatably mounted and driven by the telescope in train, and a stationary polycircuit armature winding 16 shown as physically similar to a 3-phase distributed armature winding. A second inductive device 17 is provided, this device having a rotatably mounted field winding 18 and a polycircuit armature winding 19, these windings being similar to windings 15 and 16 of the device 14. Similar points of the windings 16 and 19 are electrically connected together. The field winding 18 is rotated with the searchlight by the electric motor 12 and is connected to the motor 12 by means of a gearing 20. As shown, the field windings 15 and 18 are operated in 1:1 speed ratios with the telescope and searchlight respectively. The field winding 15 is connected to a suitable source of alternating current 21.

The inductive devices 14 and 17 are of a type often used for transmitting angular motion. In the present system, however, the inductive devices are used for producing an alternating electromotive force which has a value dependent on the angular disagreement of the telescope and searchlight, and which has a direction or polarity with respect to the alternating current supply source 21 which is determined by the direction of this disagreement. The field windings 15 and 18 are operatively connected to the telescope and searchlight respectively in such manner that when the searchlight is in angular agreement with the telescope, as shown in the drawing, the winding 18 is in a position with relation to the armature winding 19 which is at right angles to the position of the field winding 15 with respect to its armature winding 16. In other words, the field winding 15 induces electromotive forces in the circuits of the armature winding 16 which electromotive forces are impressed on the armature winding 19 and a magnetic field thereby produced in the device 17 which has an angular position in space and a direction corresponding to the angular position and direction to the field produced by the winding 15. When the telescope and searchlight are in angular agreement, the winding 18 stands at right angles to this field so that its turns are not interlinked by the field, and, therefore, no electromotive force is induced in it. When the telescope is rotated, the field of winding 15 is rotated and hence the field produced by the armature 19 is rotated a like amount so that it interlinks the winding 18 and consequently induces an electromotive force in the winding 18. This electromotive force is proportional to the amount of movement given the telescope, and it will be observed has a direction with respect to the supply source 21 which is dependent upon the direction of movement applied to the telescope. This electromotive force is used to control the driving motor 12.

Suitable power amplifying devices are provided, these amplifying devices being controlled by the electro-motive force induced in the field winding 18. As shown the field winding 18 is connected to the input circuit of an electron discharge amplifying device or tube 22 shown as being of a well known 3-electrode type. The output circuit of the tube 22 is connected through a transformer 23 to the input circuits of two 3-element electron discharge devices or tubes 24 and 25, one terminal of the secondary of the transformer 23 being connected to both of the grids 26 and 27 of the tubes 24 and 25, while the other terminal of the secondary is connected to the filaments 28 and 29 of these tubes. A suitable source of electrical supply, such as battery 30, is also connected to the filaments 28 and 29.

The output circuits of the tubes 24 and 25 are energized from the alternating current supply source 21 by means of a transformer comprising a primary winding 31 and two secondary windings 32 and 33 which are connected in the output circuits of the tubes 24 and 25 respectively. These output circuits are connected to the secondaries 32 and 33 so as to have opposite polarities, i. e., the plate 34 of the tube 24 is connected to an outer terminal of the winding 32 and likewise the plate 35 of the tube 25 is connected to an outer terminal of the winding 33, this connection being such that the plate 34 is positive when the plate 35 is negative and vice versa.

Field coils 36 and 37 of a direct current generator 38 are connected in the output circuits of the tubes 24 and 25 respectively. The inner terminal of the winding 32 is connected through a conductor 39 to one terminal of the field winding 36 and the inner terminal of the winding 33 is connected through a conductor 40 to one terminal of the field winding 37, the other two terminals of the field windings being connected to the filaments of the tubes through a conductor 41. The generator 38 is driven at a constant speed by means of an electric motor 42 which is electrically connected to a direct current supply source 43. A second direct current generator 44 is provided, this generator being likewise driven at a constant speed by means of an electric motor 45 which is electrically connected to the supply source 43. The generator 38 serves as amplifier and exciter for the field winding 46 of the generator 44, the generator 44 being of relatively large capacity and having its armature terminals connected through the conductors 47 and 48 to the armature 49 of the driving motor 12. The field winding 50 of the driving motor is constantly excited, and is connected to the direct current source of supply 43.

For the purpose of anticipating the final position of the telescope the armature winding 19 of the device 17 is rotatably mounted and operated in accordance with the energization of the motor 12. As shown the winding 19 is connected by means of a gearing 51 to a shaft 52 which may be turned by means of an arm 53. The arm 53 may be tilted to turn the shaft 52 by means of magnet coils cooperating with armatures 54 and 55 secured to the ends of the arm. As shown, two sets of magnet coils are provided. The coils 56 and 57, cooperating respectively with the armatures 54 and 55, are connected in series across the supply source 43. These coils have equal numbers of turns or are otherwise arranged to exert equal attractive forces on the armatures 54 and 55. Magnet coils 58 and 59 are also provided cooperating with the armatures 54 and 55 respectively. These coils are connected in series across the armature of the motor 12, i. e. they are connected to the conductors 47 and 48. The coils 58 and 59 are oppositely wound or otherwise arranged so that when they are energized in one direction the coil 58 will oppose the coil 56 and the coil 59 will act in the same direction as coil 57, while when energized in the opposite direction, the coil 59 will oppose the coil 57 and the coil 58 will act in the same direction as the coil 56. Springs 60 and 61 are provided for biasing the arm 53 to a substantially horizontal position.

In the operation of my invention any rotation applied to the telescope 11 produces an electromotive force in the coil 18 which electromotive force is amplified by the tube 22 and applied in amplified form to the grids 26 and 27 of the tubes 24 and 25. At some given instant the grids will be positive or negative depending upon the direction of rotation of the telescope, i. e. for one direction of rotation the grids will be positive, while for the other direction of rotation the grids will be negative. It will of course be understood that the grids are alternately positive and negative since they are energized from a pulsating current. Furthermore, the plates 34 and 35 are alternately positive and negative, one being positive when the other is negative, by virtue of their connection with the secondaries 32 and 33. Assuming that the telescope is turned in such a direction that the grid 26 is positive when its plate 34 is positive, then the tube 24 will operate and excite the field winding 36 of the generator 38. The tube 25 will, of course, be inoperative since its plate is negative when its grid 27 is positive.

The generator 38 excites the field 46 which causes an electromotive force to be produced by the generator 44 of such polarity that the motor 12 is caused to operate in a direction to cause the searchlight to follow the movements of the telescope. At the same time the motor turns the winding 18 toward a position at right angles to the field set up by the armature winding 19. In other words the winding 18 is turned in a direction to follow the rotation of the field produced by the armature winding 19. As long as the telescope is being moved, the motor continues to operate and drive the searchlight with a slight lag required to operate the control mechanism. When the telescope is brought to rest the motor will be stopped when the winding 18 has been turned to a position at right angles to the field of the armature winding 19 in which position no energy is supplied to the armature of the motor 12. In its final position the motor armature 49 is short circuited through the armature of the generator 44 whereby the motor is brought quickly to rest by dynamic braking.

As long as the motor is at rest the attractive forces on the armatures 54 and 55 applied by the coils 56 and 57 counterbalance each other so that the armature winding 19 is held without angular displacement. Under these conditions the windings 58 and 59 are not energized. When the motor is started the resulting energization of the coils 58 and 59 produces a small rotation of the shaft 52 in one direction or the other depending upon the polarity of the energy supplied by the generator 44. Assuming that the rotation of the telescope is in such direction that the field of the armature winding 19 is rotated in a clockwise direction, then the shaft 52 will be turned in such a direction that the armature winding will be turned in a counter clockwise direction, whereby the field of winding 19 will be turned back somewhat toward its original position in space. The amount of this turning depends upon the voltage applied to the coils 58 and 59, and, therefore, upon the energization of the motor, i. e. for a large angular lag of the searchlight a relatively great electromotive force will be applied to the motor armature whereby the motor will be operated at high speed. This relatively great electromotive force will produce a correspondingly great rotation of the winding 19. The effect of turning winding 19 is to offset to some extent the turning of the telescope, with the result that the voltages induced in the winding 18 are not as great as would otherwise be the case, and consequently the motor does not operate at as high speed. As the searchlight approaches the position of the telescope the speed of the motor decreases, since the electromotive force induced in winding 18 decreases as it approaches a position of right angles to the field of winding 19, and likewise the energization of the coils 58 and 59 is decreased whereby the armature 19 is turned gradually in a clockwise direction.

The effect of the rotation of the armature winding 19 is thus to anticipate the final position of the searchlight so that the speed of the motor 12 is reduced and the searchlight thereby brought somewhat gradually to its final position. It will be observed that when the motor is accelerating the winding 19 is turned in a direction to tend to reduce the speed of the motor, whereas when the motor is decelerating, the winding 19 is turned in a direction to tend to gradually increase the speed of the motor, the searchlight then approaching angular agreement with the telescope. This action of reducing the speed of the motor, is of particular importance and prominence as the searchlight nears positional agreement with the telescope so that the rapid deceleration of the motor is checked somewhat and the motor thereby caused to operate at a lower speed as it moves the searchlight into angular agreement with the telescope. For this reason the motor stops with greater accuracy in its final position. Overrunning is thus prevented.

Upon rotation of the telescope in the opposite direction the grids 26 and 27 become positive when the plate 35 is positive, the plate 34 then being negative. This causes operation of the tube 25 whereby the field 37 is excited in such direction that the generator 38 produces an electromotive force which is opposite that produced by the field winding 36. As a result an electromotive force of opposite polarity is applied to the armature 49 of the motor whereby the motor operates in the opposite direction. In like manner the rotation of the winding 19 is reversed, the operation being such that the searchlight is brought into angular agreement with the telescope without overrunning as before.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. Means for driving an object into positional agreement with a remote controlling object, comprising an electric driving motor for said driven object, control means for said motor actuated by said objects to cause said motor to drive the driven object into positional agreement with the controlling object, and electrical means responsive to the energization of said motor for varying the speed of said motor.

2. Means for driving an object into positional agreement with a remote controlling object, comprising an electric driving motor for said driven object, control means for said motor actuated by said objects to cause said motor to drive the driven object into positional agreement with the controlling object, and electrical means responsive to the energization of said motor acting upon said control means so as to reduce the speed of said motor to prevent overrunning.

3. Means for driving an object into positional agreement with a remote controlling object comprising an electric driving motor for said driven object, control means for said motor actuated by said controlling object to cause said motor to drive the driven object into positional agreement with the controlling object, and electrical means responsive to the energization of said motor operating on said control means so as to tend to gradually reduce the speed of said motor when said motor is accelerating and to gradually increase the speed of said motor when said motor is decelerating.

4. Means for driving an object into positional agreement with a remote controlling object comprising means driven by said controlling object for producing an alternating magnetic field rotating in accordance with the movement of said controlling object, a motor for driving said driven object, means responsive to the angular position of said field for controlling said motor to cause said motor to drive the driven object into positional agreement with the controlling object, and electrical means responsive to the energization of said motor for turning said field independently of said controlling object.

5. Means for driving an object into positional agreement with a remote controlling object comprising means driven by said controlling object for producing an alternating magnetic field rotating in accordance with the movement of said controlling object, a motor for driving said driven object, means responsive to the angular position of said field for controlling said motor to cause said motor to drive the driven object into positional agreement with the controlling object, and electrical means responsive to the energization of said motor for turning said field independently of said controlling object first in a direction opposite to its rotation by said controlling object and thereafter back to a predetermined position with said controlling object as the driven object moves into positional agreement with said controlling object.

6. Means for reproducing position comprising in combination with a controlling object and a driven object, a driving motor for said driven object, means for producing an electromotive force upon positional disagreement of said objects corresponding in value and direction to the amount and direction of said positional disagreement, means responsive to said electromotive force for controlling said motor whereby said motor is caused to drive said driven object into positional agreement with said controlling object, and electrical means responsive to the energization of said motor for varying said electromotive force so as to reduce the speed of said motor.

7. Means for reproducing position comprising in combination with a controlling object and a driven object, driving means for said driven object, means for producing an alternating electromotive force upon angular disagreement of said objects having a direction determined by the direction of such angular disagreement, power amplifying means responsive to said electromotive force arranged to selectively apply its amplified output to control said motor in accordance with the direction of said electromotive force, whereby said motor is caused to drive said driven object into positional agreement with said controlling object, and electrical means responsive to the energization of said motor for first reducing and then increasing said electromotive force so as to reduce the speed of said motor.

8. Means for reproducing position comprising in combination with a controlling object and a driven object, means for producing an alternating magnetic field rotating in accordance with the rotation of said controlling object, a coil in said field rotating with said driven object, a motor for driving said driven object, means responsive to the electromotive force induced in said coil for controlling said motor, and electrical means responsive to the energization of said motor for rotating said field independently of said controlling object.

9. Means for reproducing position comprising in combination with a controlling object and a driven object, means for producing an alternating magnetic field rotating in accordance with the rotation of said controlling object, a coil in said field rotating with said driven object, a motor for driving said driven object and said coil, means responsive to the electromotive force induced in said coil for controlling said motor, and electrical means responsive to the energization of said motor for rotating said field independently of said controlling object in a direction opposite to its rotation by said controlling object whereby the motor is caused to operate at a lower speed, said means operating to rotate said field back to a predetermined angular relation with the controlling object as the driven object moves into positional agreement with the controlling object.

10. Means for reproducing position comprising in combination with a controlling object and a driven object, a field winding rotated by said controlling object in a predetermined angular relation therewith, a source of alternating current supply connected to said field winding, a polycircuit armature winding associated with said field winding, a second rotatably mounted polycircuit armature winding electrically connected to said first armature winding so as to produce an alternating magnetic field moving with said controlling object, a motor for driving said driven object, a rotatably mounted magnet coil in said field driven by said motor, means responsive to the electromotive force induced in said coil for controlling said motor so as to cause the motor to drive the driven object into positional agreement with the controlling object, and electrical means responsive to the energization of said motor for turning said second armature winding so as to decrease the motor speed.

11. Means for driving an object into positional agreement with a remote controlling object, comprising an electric driving motor for said driven object, control means for said motor actuated by said controlling object to cause said motor to drive said driven object into positional agreement with said controlling object, and electromagnetically operated means responsive to the operation of said motor for controlling said motor so as to tend to reduce the speed of said motor when said motor is accelerating and to increase the speed of said motor when said motor is decelerating.

12. Means for driving an object into positional agreement with a remote controlling object, comprising means driven by said controlling object for producing an alterating magnetic field rotating in accordance with the movement of said controlling object, a motor for driving said driven object, means responsive to the angular position of said field for controlling said motor to cause said motor to drive the driven object into positional agreement with the controlling object, and electromagnetically operated means responsive to the energization of said motor for turning said field independently of said controlling object.

13. Means for driving an object into positional agreement with a remote controlling object, comprising means driven by said controlling object for producing an alternating magnetic field rotating in accordance with the movement of said controlling object, an electric motor for driving said driven object, an electrical supply source for said motor, means responsive to the angular position of said field for applying varying voltages to said motor so as to cause said motor to drive the driven object into positional agreement with the controlling object, a pair of magnet coils connected to said supply source, a second pair of magnet coils connected to the circuit of said motor so that one will oppose or aid and the other aid or oppose said first pair of coils respectively, depending on the direction of operation of said motor, and means operated by said coils for turning said field independently of said controlling object.

In witness whereof, I have hereunto set my hand this 28th day of September, 1925.

SAMUEL P. NIXDORFF.